(12) United States Patent
Honda

(10) Patent No.: US 6,857,416 B2
(45) Date of Patent: Feb. 22, 2005

(54) KNOCKING DETECTING DEVICE FOR AUTOMOBILE

(75) Inventor: Takayoshi Honda, Kariya (JP)

(73) Assignee: Denso Corporation, Kariya (JP)

(*) Notice: Subject to any disclaimer, the term of this patent is extended or adjusted under 35 U.S.C. 154(b) by 0 days.

(21) Appl. No.: 10/815,953

(22) Filed: Apr. 2, 2004

(65) Prior Publication Data
US 2004/0194536 A1 Oct. 7, 2004

(30) Foreign Application Priority Data
Apr. 4, 2003 (JP) ........................................ 2003-102027

(51) Int. Cl.[7] ................................................. F02P 5/00
(52) U.S. Cl. ............................. 123/406.21; 123/406.39
(58) Field of Search ...................... 123/406.21, 406.29, 123/406.34, 406.39

(56) References Cited

U.S. PATENT DOCUMENTS 5,991,686 A * 11/1999 Oguro et al. ................ 701/115
6,311,672 B1 * 11/2001 Morishita et al. ....... 123/406.36
6,378,494 B1 * 4/2002 Hatazawa et al. ....... 123/406.39
6,701,894 B2 * 3/2004 Katagami ............... 123/406.33

FOREIGN PATENT DOCUMENTS

| JP | 58-026229 | 2/1983 |
| JP | 3-21545 | 3/1991 |
| JP | 05-332192 | 12/1993 |
| JP | 2764495 | 4/1998 |

* cited by examiner

Primary Examiner—Mahmoud Gimie
(74) Attorney, Agent, or Firm—Nixon & Vanderhye P.C.

(57) ABSTRACT

A knocking detecting device executes A/D conversion of a knock sensor signal every constant time ts and executes filter processing of the converted digital signal. The knocking detecting device determines whether the knocking arises or not according to the filter processed data. The device measures a TDC signal falling period T every 120° CA. The period indicating of 5° CA is divided by a constant period ts to obtain a value which is rounded off to derive an integer N. At a timing in which the crankshaft rotates to 10° CA from the TDC signal falling, the filter processed data which are derived every A/D timing ts are integrated every N pieces of data. When the number of integrated value reaches 12, knocking determining process is executed based on the 12 integrated values.

7 Claims, 12 Drawing Sheets

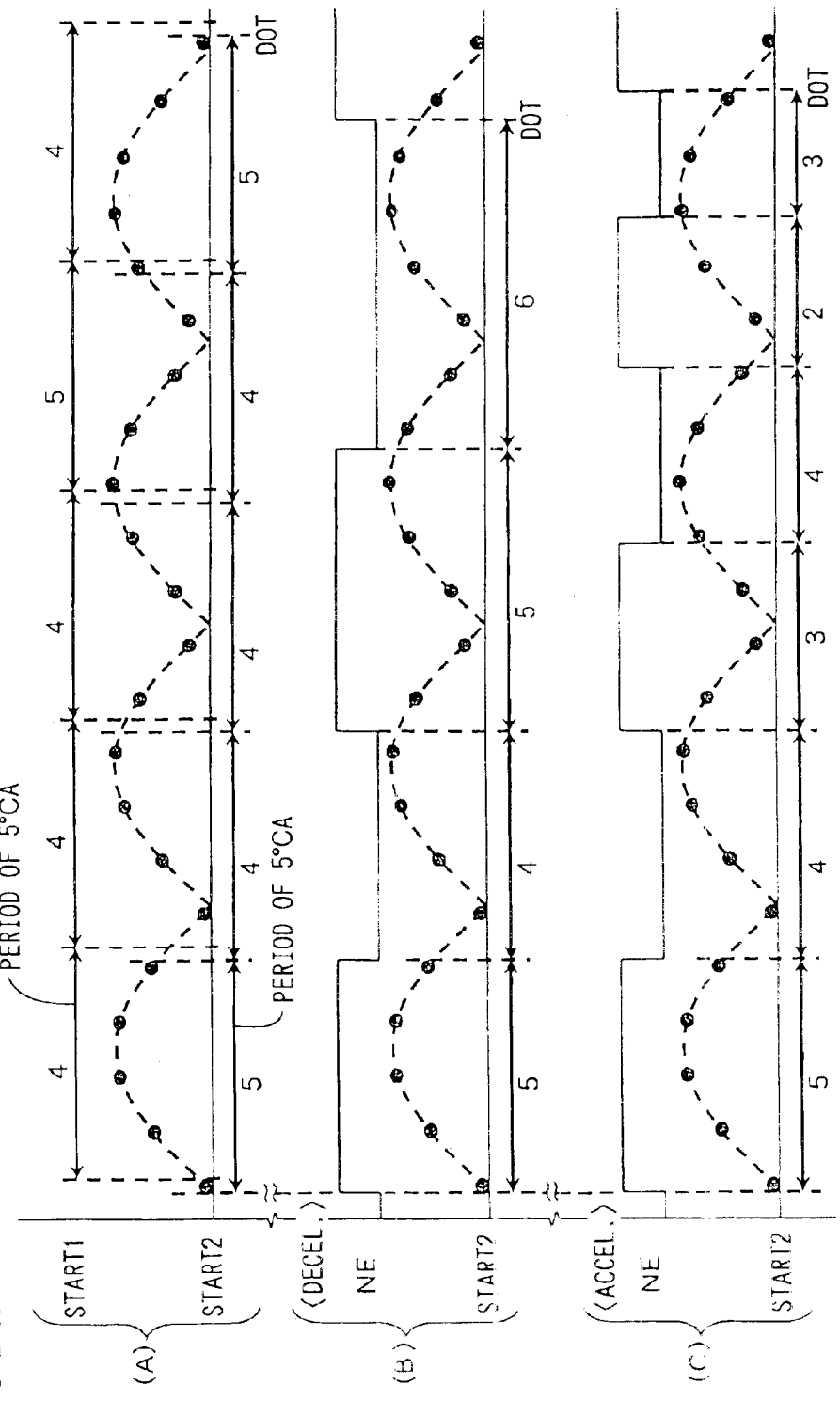

KNOCKING DETECTING DEVICE FOR AUTOMOBILE

CROSS-REFERENCE TO RELATED APPLICATION

This application is based on Japanese Patent Application No. 2003-102027 filed Apr. 4, 2003, the disclosure of which is incorporated herein by reference.

FIELD OF THE INVENTION

The present invention relates to a knocking detecting device for an automobile.

BACKGROUND OF THE INVENTION

Japanese patent No. 2764495 shows a conventional knocking detecting device for an automobile. In this device, an analog signal output from a knock sensor is analog-to-digital converted in a constant sampling period and the converted data (sampling data) on the time series are digital filter processed. Then, a knocking is detected base on the sampling data. An analog-to-digital conversion is referred as A/D conversion and an analog-to-digital converter is referred as A/D converter herein after.

A knocking detection is processed according to all filter-processed data which are saved every sampling timing during a knocking detection period. During knocking detection, a knock sensor signal is processed and the crankshaft of an internal combustion engine rotates in a predetermined angle.

Since the device takes a long time to detect the knocking in low rotation of an engine, a large number of the data should be stored so that a memory capacity and processing load are increased.

To avoid such a problem, it is suggested that a filter-processed data are integrated to every fixed number N and the existence of the knocking is detected from the integrated value to reduce the stored data. In such a process, the integrated filter processed data can be deleted and only integrated data are stored so that which the number of the stored data can be reduced to "1/K". As shown in FIG. 13, the knocking detection is carried out according to the fluctuation of the integrated value.

The device described above needs a long period to detect knocking and the number of stored data (the number of integrated number) is increased in a low rotation of the engine. If the value N is increased to decrease the number of integrated value, the number of integrated value is reduced in a high rotation of the engine and the knocking detection cannot be carried out precisely. That is, if the number of the integrated value is too small, the characteristic of the knocking cannot be detected.

To avoid such a problem, it suggested that A/D converted and digital-filtered data are integrated every period in which a crankshaft rotates to predetermined angle R (for example 5° CA) instead of every fixed number. That is, a timing signal arises every timing in which the crankshaft rotates to a predetermined angle R, the filter-processed data are integrated during a time period from the timing signal arising to the next timing signal arising. Consequently the number of the integrated value is restrained to a proper number to detect the knocking. "CA" is referred to a rotational angle of the crankshaft (crank angle).

In the case of integration of the filter-processed data every period in which a crankshaft rotates to predetermined angle, another problem arises.

The filter-processed data every sampling timing is grouped every time period of crank angle. The number of the filter-processed data which are integrated in a predetermined angle (5° CA) fluctuates as shown FIG. 14A. Dots in FIG. 14 represent a sampling timing (A/D conversion timing) of the knock sensor signal and a timing of calculation of new filter processed data.

When 5° CA indicates 85 $\mu$s and a sampling period of the knock sensor signal indicates 20 $\mu$s (50 k Hz), four or five data are integrated are integrated in the 5° CA period. The number of the filter-processed data in an integrated value fluctuates.

As shown in FIGS. 14B and 14C, the number of filter processed data fluctuates due to an acceleration or deceleration of the engine. "NE" in FIGS. 14B and 14C represents a timing signal which traverses every 5° CA.

When the number of the filter-processed data in each integrated value fluctuate, the integrated values also fluctuates due to the other condition besides the wave of the knock sensor signal. Thus, the knocking cannot be detected precisely and the feature of the knocking can no be obtained precisely.

SUMMARY OF THE INVENTION

An object of the present invention is to reduce the number of the stored data and to detect the knocking precisely.

A knocking detecting device of the present invention has a signal processing means which converts an analog knock sensor signal into a digital knock sensor signal and filters the digital knock sensor signal digitally every sampling period.

A calculating means of the invention calculates the number of the A/D conversion for rotating of the crankshaft to a predetermined angle and converts the number into integer N. Dividing the period for rotating of the crankshaft to the predetermined angle by a sampling period derives the number of the A/D conversion.

An integrating means of the invention integrates the filter-processed data processed by the signal processing means each N and a knock detecting means detects the existence of the knocking based on the plural integrated values. The calculating means derives N before the integrating means starts to process and N is not updated during the processing period of the integrating means.

The integrating means integrates N pieces of filter-processed values corresponding to the period in which the crankshaft rotates to a predetermined angle. The value of N is constant during the processing of the integrating means regardless of a start timing of integration and the acceleration or deceleration of the engine. Therefore, the knocking detection is carried out based on N pieces of the filter-processed data regardless of a start timing of integration and the acceleration or deceleration of the engine.

The period in which the integrating means performs is defined as following two examples.

Example 1: The period is defined as a period from a starting time of processing to a time when the number of integrated value becomes "M". "M" is a natural number larger than 2.

Example 2: a period from a starting time of processing to a time when the crankshaft rotates to a predetermined angle.

In both of the examples, N is not fixed number but is established according to the rotational number of the engine. Thus, it is avoided that the number of stored data for detecting the knocking is increased in the low rotational speed of the engine and the number of stored data is decreased in the high rotational speed of the engine for precise knocking detection.

According to the present invention, the precise knocking detection is carried out with small number of stored data.

When the knock detecting means detects the knocking according to "P" pieces of integrated value, the knock detecting period is the period in which the crankshaft may rotate to the angle: "the predetermined angle"×"P". During the period, it is determined whether the knocking exists or not.

BRIEF DESCRIPTION OF THE DRAWINGS

FIG. 14 is a second graph for explaining a conventional system and the problem thereof.

DESCRIPTION OF THE PREFERRED EMBODIMENTS

Figure 1:
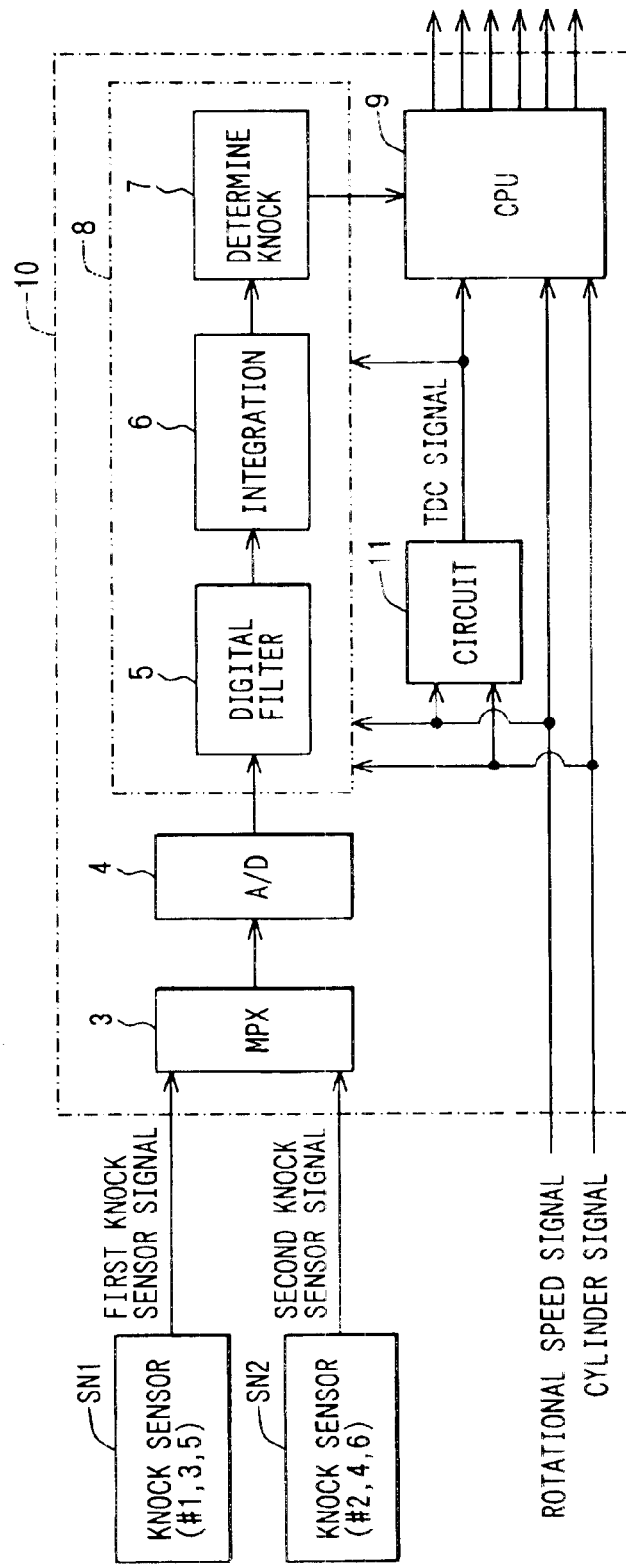
FIG. 1 is a block diagram showing an engine control system in a first embodiment of the invention.

FIG. 1 is a block diagram showing an engine control system 10 which controls a gasoline engine (an internal combustion engine) having six cylinders.

The engine control system 10 is provided with a multiplexer (MPX) 3, an A/D converter 4, a digital filtering processor 5, a summation processor 6, a knocking determine processor 7, and a CPU 9.

The engine control system 10 receives a first analog signal (refereed as the first knock sensor signal hereinafter) and a second analog signal (refereed as the second knock sensor signal hereinafter). Knock sensors SN1 each of which is respectively disposed on the three cylinders in six cylinders detect the first knock sensor signal. In this embodiment, the knock sensors SN1 are disposed on a first cylinder # 1, a third cylinder # 3, and a fifth cylinder # 5. Knock sensors SN2 each of which is respectively disposed on other three cylinders detect the second knock sensor signal. In this embodiment, the knock sensor SN2 are disposed on a second cylinder # 2, a fourth cylinder # 4, and a sixth cylinder # 6.

The multiplexer (MPX) 3 receives one of the first knock sensor signal or second knock signal selectively. The A/D converter 4 converts the signal outputted from the multiplexer 3 during a sampling period ts. In this embodiment, the sampling period is 10 $\mu$ seconds. The digital filtering processor 5 filters the signal converted by the A/D converter 4 digitally. The summation processor 6 adds the data filtered by the digital filtering processor 5, which adds absolute value of the data. The knocking determine processor 7 determines if the knocking arises or not according to the summed value. The CPU 9 controls an ignite timing and an amount of fuel and the like according to the result of the knocking determine processor 7, the rotational number of the engine, a coolant temperature and other condition of the engine.

The digital filtering processor 5, the summation processor 6 and the knocking determine processor 7 are comprised of microcomputer 8 having CPU, ROM, and RAM.

The engine control system 10 receives a rotational number signal and a cylinder-determining signal. The rotational number signal is for detecting a rotational speed and a rotational position of a crankshaft, which is a pulse signal per a predetermined crankshaft angle. The cylinder determining signal is for determine which cylinder should be ignited, which is a pulse signal per two rotations of the engine 2.

A signal generate circuit 11 generates a TDC signal. As shown in uppermost of FIG. 2, the TDC signal has a falling edge at the timing of each piston top dead center position. The signal generating circuit 11 outputs the TDC signal to the microcomputer 8 and the CPU 9. In this embodiment, since the engine has six cylinders, the TCD signal falls every 120-degree of the crankshaft angle.

Referring to FIGS. 2–6, the processing of the microcomputer 8 as the digital filtering processor 5, the summation processor 6 and the knocking determine processor 7 is described herein after.

Figure 2:
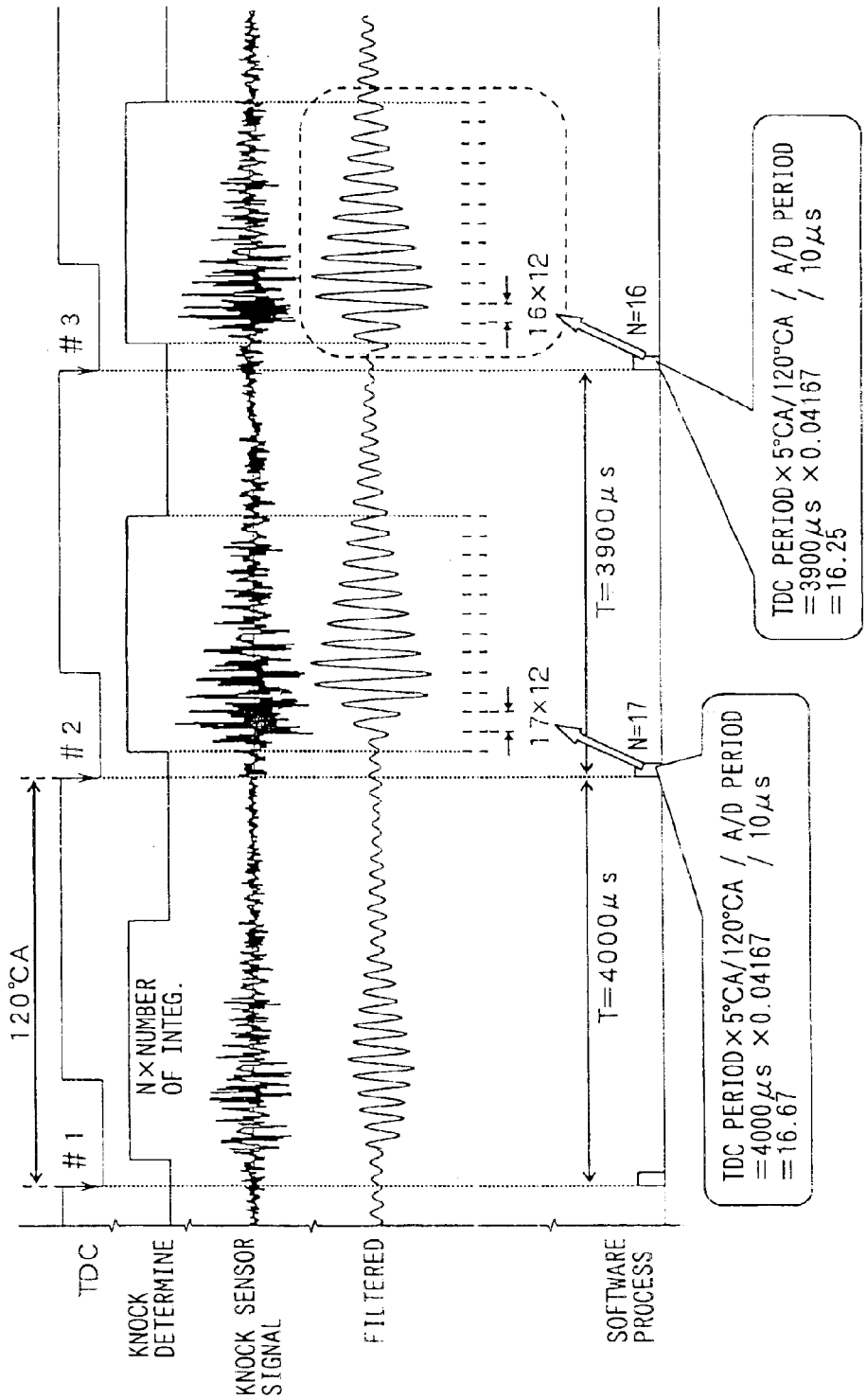
FIG. 2 is a time diagram showing a processing executed by a microcomputer mounted on the engine control system in the first embodiment.
Figure 3:
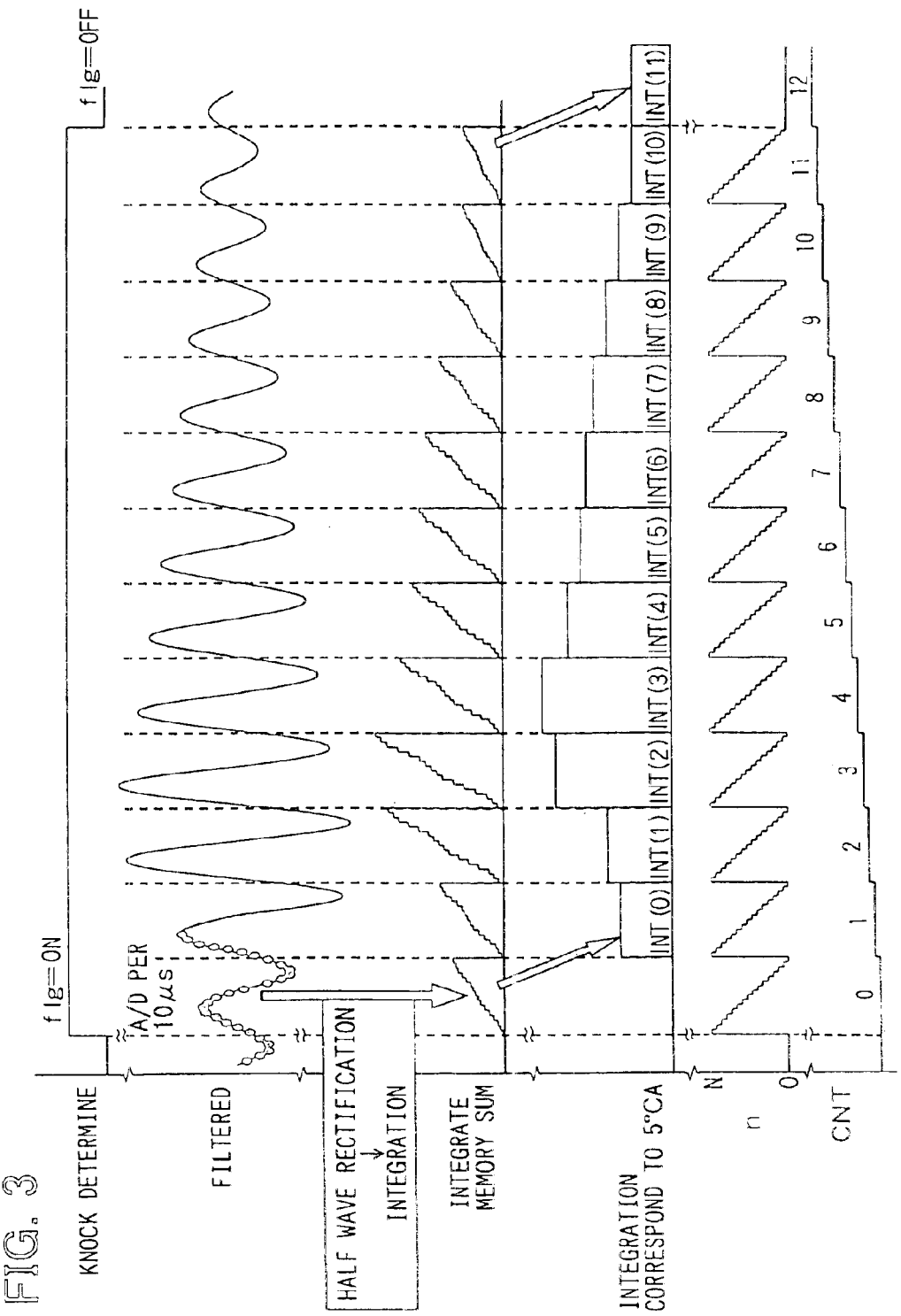
FIG. 3 is a time diagram showing a processing per one ignition.

FIG. 2 is a time diagram showing a processing executed by a microcomputer and FIG. 3 is a time diagram showing a processing per one ignition, which shows especially an area surrounded by a broken line in FIG. 2.

The multiplexer 3 selects the first knock sensor signal or the second knock sensor signal and outputs the signal to the A/D converter 4 at every timing of the falling edge of the TDC signal. For example, the knock sensor signal outputted the A/D converter 4 is changed from the second knock sensor signal to the first knocking sensor signal corresponding to the first cylinder # 1 at timing of TDC of the first cylinder # 1. The knock sensor signal outputted the A/D converter 4 is changed from the first knock sensor signal to the second knocking sensor signal corresponding to the second cylinder # 2 at timing of TDC of the first cylinder # 2.

The knock sensor signal can be changed at the timing of the gate finishing to the expected knock sensor signal corresponding to the next cylinder. The timing of the gate finishing is the timing of finishing adding the filtered result data. In such a processing, the period from the changing of the knock sensor to the opening gate timing is kept enough. That is, the period from the changing the knock sensor signal inputted to the A/D converter 4 from the multiplexer 3 to the opening gate timing is enough. Though there is a delay from the changing the knock sensor signal to the getting the stable filtered data, the period from the changing of the knock sensor signal to the gate opening timing of the next the cylinder exceeds the delay when the knock sensor signal is changed to the signal corresponding to the next cylinder and inputted to the A/D converter 4 at the timing of gate finishing before the TDC timing.

To explain the embodiment easily, the first knock sensor signal and the second knock sensor signal are both referred as the knock sensor signal.

In this embodiment, the knocking determining period is from the timing of 10-degree CA (timing of ATDC 10-degree CA) to the timing of 60-degree CA. ATDC means the angle of crankshaft after the timing of TDC.

Figure 4:
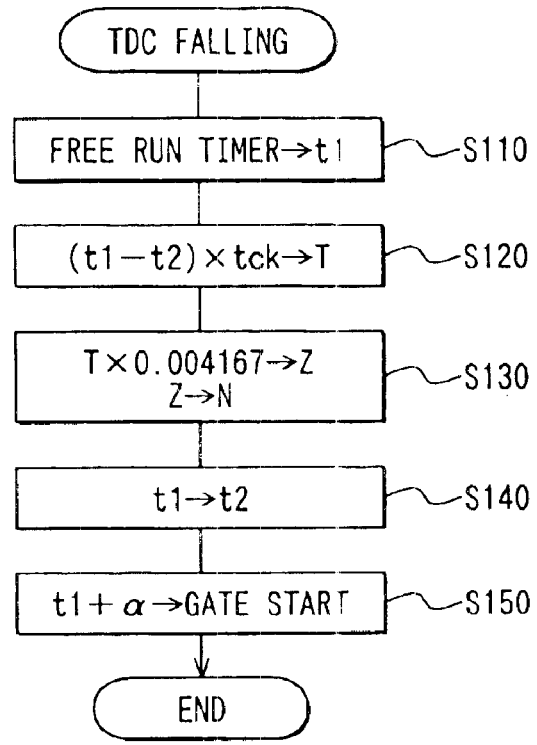
FIG. 4 is a flow diagram showing a TDC falling process executed by the microcomputer in the first embodiment.

FIG. 4 is a flow diagram showing a processing just falling of TDC signal. When the microcomputer 8 begins to start the processing, a value of a free run timer is memorized in memory t1 of RAM in step S110. The free run timer is of a count-up timer which counts up by means of the internal clock of the microcomputer 8.

In step S120, a value memorized in a memory t2 of RAM is subtracted from the value memorized in the memory t1 and the value (t1−t2) is obtained. Next, the TDC period T corresponding to 120-degree CA from the previous TDC timing to present TDC timing is calculated by multiplying the value (t1−t2) by one count up time tck (one period of the internal clock) as shown in FIG. 2. A value of the free run timer at the previous TDC timing is memorized in the memory t2.

In step 130, a value Z is calculated by a following equation. The period to rotate the crankshaft in a predetermined angle (in this embodiment, the angle is 5-degree) is divided by the sampling period ts (=10 μs) and the value Z is obtained. Furthermore, the value Z is converted into an integer N by rounding.

$$Z = T \times 0.004167 \quad \text{[equation 1]}$$
$$= T \times (5° \ CA / 120° \ CA / 10 \ \mu s)$$

The integer N is a whole number of A/D converting number (sapling number; number of sampling data) corresponding to 5° CA based on the rotational speed of the engine (=TDC period T in this embodiment). Rounding up or rounding down the value Z can derive the integer N.

In step S140, the value of memory t1 is copied to the memory t2. In step S150, the count number α is calculated based on the following equation with value (=t1−t2), which corresponds to 10° CA. The value of the memory t1 is added to the count number α, and the added value is memorized as a gate stating time.

$$\alpha=(t1-t2)\times(10° \ CA/120° \ CA) \quad \text{[equation 2]}$$

The gate starting time is an estimated time in which the crankshaft rotates 10° from the present TDC timing based on the rotation speed of engine (=TDC period T in this embodiment). After the process of step S150 is executed, the falling process of the TDC is completed.

Figure 5:
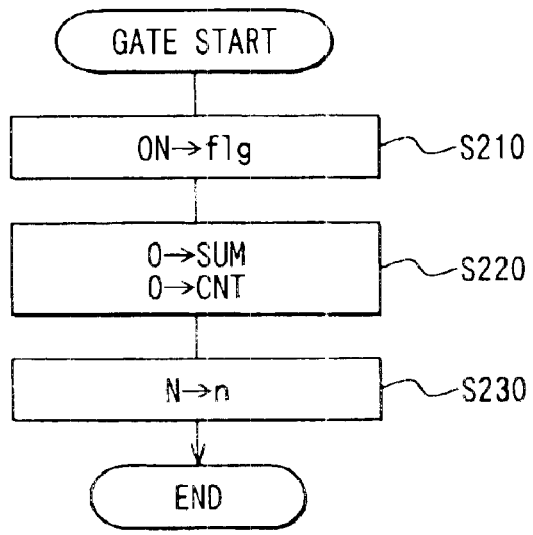
FIG. 5 is a flow diagram showing a gate open timing processing executed by the microcomputer in the first embodiment.

FIG. 5 is a flow diagram showing a gate starting timing process which is executed at the time when the value of the free run timer is in consonance with the gate starting time memorized in step S150.

When the microcomputer 8 starts to execute the gate starting time process, a flag flg is turned on in step 210 and then the value of the memory for summation SUM and counter for summation CNT (referred as counter CNT herein after) are cleared to zero. In step S230, the value N calculated in step S130 is memorized in a memory n of RAM and the process of the gate starring time process is completed.

When the system can detect the crank angle from the TDC timing based on the rotational signal and the like, ATDC 10° CA is established instead of the gate starting time, the process shown in FIG. 5 can be executed based on ATDC 10° CA.

Figure 6:
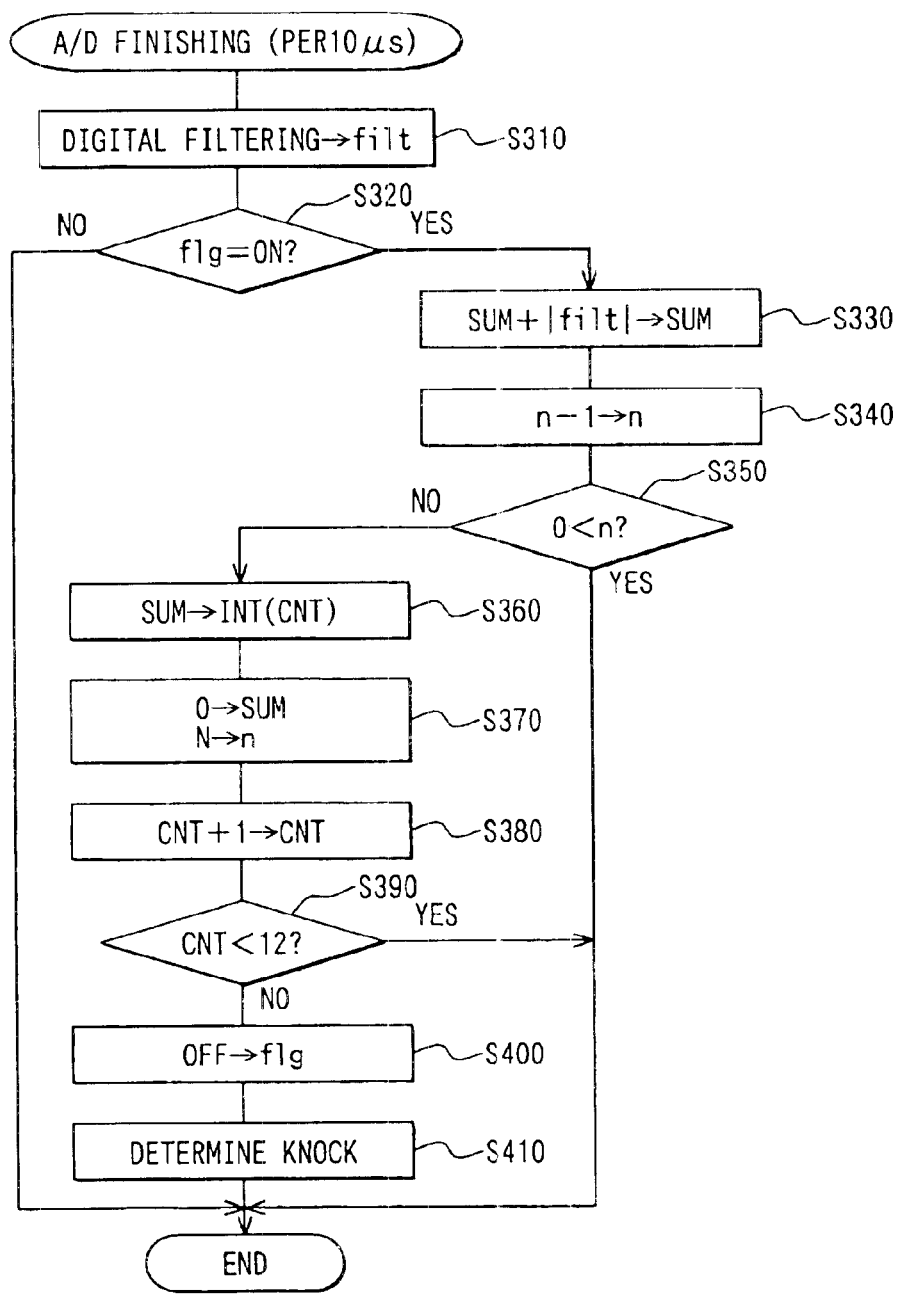
FIG. 6 is a flow diagram showing an A/D finishing processing executed by the microcomputer in the first embodiment.

FIG. 6 is a flow diagram showing the A/D finishing process which is executed at every time when the A/D conversion of the knock sensor signal is completed.

When the microcomputer 8 starts to execute the A/D finishing process, a digital filter process is executed and the digital filtered data is memorized in a memory filt of RAM. The digital filter process is of FIR or IIR digital filter process in which the newest time series A/D converted value is digitally filtered.

In step S320, it is determined whether the flag flg is ON or OFF. When the flag flg is not ON (in S320: NO), the A/D finishing process is completed. When the flag flg is ON (in S320: YES), the filter-processed data is integrated in step S330.

In step S330, the absolute value of the memory filt is added to the value of the integrate memory SUM and the added value is re-memorized in the integrate memory SUM.

In step S340, the value of the memory n is decremented by 1 (−1), and it is determined whether the value of memory n is more than zero in step S350.

When it is determined the value of the memory n is more than zero (in S350: YES), the A/D finishing process is completed. When the value of the memory n is not more than zero (that is, the value of the memory n is zero), step 360 is executed. In step 360, the present value of the integrate memory SUM is memorized as an integrated value INT (CNT) shown by the counter CNT.

For example, when the value of the counter is zero, the value of the integrate memory SUM is memorized as a first integrate value INT: zero. When the value of the counter is 1, the value of the integrate memory SUM is memorized as a second integrate value: 1. In this embodiment, the first value of the counter CNT is zero in step S220, the first integrate value is represented as INT (0).

In step S370, the value of the integrate memory SUM is cleared to zero, and the value N calculated in step S130 is re-memorized and the value of counter CNT is incremented (+1).

Next, it is determined whether the value of the counter CNT is less than the predetermined value (in this embodiment, the value is 12). When the value of the counter CNT is less than 12, the A/D finishing process is completed.

When the value of the counter CNT is not less than 12 in step S390 (that is, the value of the counter CNT reaches 12), the flag flg is turned off in step S400.

In step S410, it is determined whether knocking occurs or not based on the plural integrate values memorized in step S360. In this embodiment, it is based on from the first integrate value INT (0) through the twelfth integrate value INT (11). The occurrence of the knocking is determined based on the fluctuations in the number of the integrate values, maximum value among the integrate values and the like. Then, the A/D finishing process is completed.

In the first embodiment, the TDC interval (interval of the TDC signal falling at every 120° CA) is measured as the rotational speed of the engine in step S111, S120, S140. The value Z is calculated in step S130 and, the value N is derived by rounding the value Z.

When the period from the TDC timing of the first cylinder #1 to the TDC timing of the second cylinder #2 is 4000 µs as shown in FIG. 2, the value N is 17 which is calculated at the TDC timing of the second cylinder #2. When the period from the TDC timing of the second cylinder #2 to the TDC timing of the third cylinder #3 is 3900 µs, the value N is 16 which is calculated at the TDC timing of the third cylinder #3. The timing of a software process shown in lowest portion of FIG. 2 represents the timing in which the TDC falling process is executed. After a laps of time which corresponds to 10° CA indicated by the counter value α, the gate starting time process is executed, the flag flg is turned ON (S210), the value of the integrate memory SUM and the counter CNT are cleared to zero (S220), and the value N at previous TDC timing calculated in step S130 is memorized in the memory n of RAM (S230).

After the time when the flag is turned ON, the A/D conversion of the knocking sensor signal by the A/D converter 4 is completed, the digital filter processing is executed in step S310, it is determined YES in step S320, and the filter processed data are integrated by number of N according to steps S330–S390.

In the A/D finishing process of FIG. 6, the filter-processed data are integrated. The number of integrate process is counted by decreasing the value of the memory n from N to zero by 1 in the process of step S340 and S350. At every time when the integrate process is executed N times (the value of the memory n is zero), the value of the integrate memory SUM is memorized as the integrate value INT (CNT) in step S360, the value of the counter CNT is counted up by 1 in step S380 so that the number of the integrate value is calculated.

When the number of the integrate value is 12 (in step S390: NO), the flag flg is turned off (S400), and it is determined whether the knocking is occurred based on the integrate values INT (0) through INT (11) which are calculated while the flag is turned ON.

When the TDC timing of the next cylinder comes, the value N is renewed by executing the TDC falling process. The process of FIG. 6 is executed based on the renewed value N.

Even when the integrate process is not executed, the digital filter process (S310) is executed, because the digital filter process is supposed to FIR type or IIR type and a past value is necessary besides the newest value.

A predetermined value compared with the value of the counter CNT in step S390 is established as 12 (twelve integrate values is required) in this embodiment. It is because the period of 60° CA from ATDC 10° CA to ATDC 70° CA is established as a knock determine period. Namely, the value N is a number of sampling (=the number of filter processed data) corresponding to 5° CA, and the period to acquire a integrate value is a period corresponding to 5° CA. Thus, when the knock determination is executed based on the data corresponding to 60° CA, the twelve integrate values are necessary.

In this embodiment, the A/D converter 4 and the processing in step 310 in FIG. 6 correspond to a signal processing means of the present invention, the processing in step S110 through step S140 in FIG. 4 corresponds to calculating means of the invention, the processing in step S330 through S390 corresponds to an integrating means of the invention, and the processing in step S410 in FIG. 6 corresponds to knock determining means of the invention. The timing of the flag ON corresponds to a start timing of the integrating means.

The engine control system 10 of the first embodiment can reduce the number of data to be memorized in order to determine the occurrence of the engine knocking precisely.

Each integrate value INT (CNT) for the knocking determination is an integrated value of N filter processed data in a period in which the crankshaft rotates in a predetermined angle (in this embodiment: 5°). The number of filter processed data is N and this number is constant notwithstanding the start timing of the integration, acceleration and deceleration of the engine while integrate processing is executed. The value of N is not fixed value and established by the equation 1 based on the rotational number of engine. Therefore, it prevents the number of the data from increasing at low rotational speed of engine and decreasing at high rotational speed of the engine.

Since the TDC period T is measured as a rotational speed of the engine and TDC period T is multiplied by the constant number (=0.004167) to get the value Z, the rotational speed of the engine is not calculated in the [rpm] dimension and load of processing to calculate the value N is decreased. The TDC period T is an interval between adjacent falling edges of the TDC signal (standard signal in this invention) which arises every 120° of crankshaft (a constant angle in this invention). The period corresponding to 5° CA is divided by the sampling period to get the value Z. In stead of the TDC period T, the period between pulse signals arise at every 30° of the crankshaft can be measured to obtain the value Z and value N.

In step S130 shown in FIG. 4 as the calculating means, it is determined whether the TDC period T calculated in step 120 is between a first predetermined value T1 and a second predetermined value T2. (Case 1): In case of T≧T1, the value N is fixed to value N1. (Case 2): In case of T≧T2, the value N is fixed to value N2 (<N1)

In the case 1, it is avoided that the value N exceeds a predetermined value in low speed of engine and the integrated value such as the integrate memory SUM and value INT overflows. When the value N is fixed to the first value N1, the number of the integrate value INT is increased so that the substantial knocking determination period is not reduced.

In the case 2, accuracy of the integrate value is kept high even in the high rotation speed of the engine. When the value N becomes small according to the engine speed up, the integrate value may be fluctuated and the detecting accuracy of the knocking may be decreased. Since the value N is fixed to the value N2 at high engine speed, the deterioration of the detecting accuracy is avoided.

Figure 7:
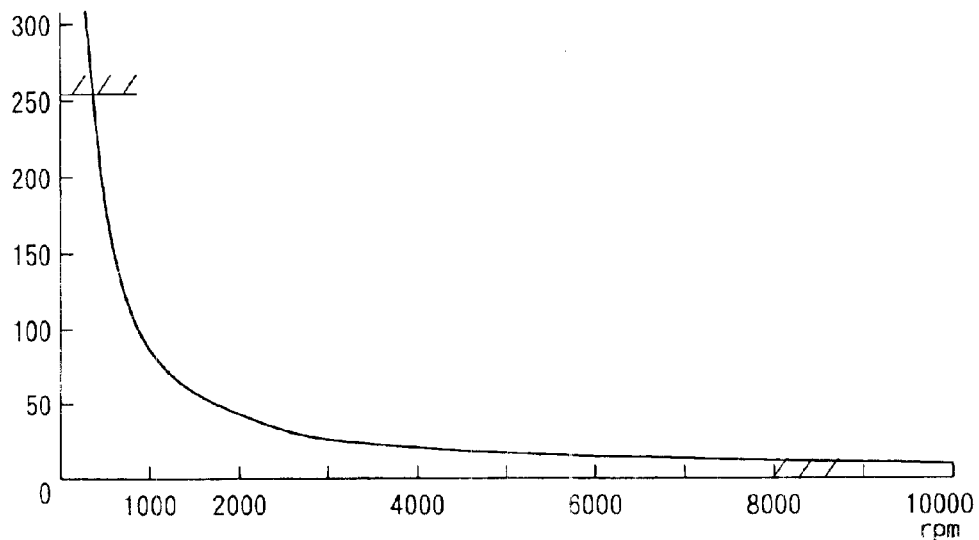
FIG. 7 is a graph showing a relation between a rotation number of an engine (a lateral axis) and a numeral N (a longitudinal axis) when an engine has six cylinders and an A/D conversion is executed at every 10 $\mu$s.

FIG. 7 is a graph showing the relationship between the RPM of the engine (a lateral axis) and value N (a longitudinal axis), wherein the engine has 6 cylinders, and an A/D conversion is processed at every 10 µs. When the speed of engine is 1000 rpm and the TDC period T is 20 ms, the value N is 83. When the speed of the engine is 327 rpm and the TDC period T is 61.2 ms, the value N is 255. When the speed of the engine is 8333 rpm and the TDC period T is 2.4 ms, the value N is 83. Therefore, when the speed of engine is less than 327 rpm, the value N is fixed to 255,and when the speed of the engine is larger than 8333 rpm, the value N is fixed to 10.

The processing of the value N can be applied to the other embodiment and modifications described below.

In the first embodiment, rounding the value Z in step S130 shown in FIG. 4 derives the value N. When the value N is derived by rounding off the number of decimal places i.e. the number of decimal places of the value Z is less than 0.5, the number of the integrate value INT can be increased. For example, in step S390 shown in FIG. 6, the set value 12 can be changed into 13.

When the value N is derived by rounding off and the number of integrate value is not increased, the period from the timing of the flag ON to the timing of finishing the calculation twelve integrated values are shorter than the actual period corresponding to 60° CA which is knock determining period. By increasing the number of integrate value from 12 to 13, it is prevented that the actual knock determining period is shorter than the designed knock determining period. In other words, the integrate value corresponding to 60° CA can be obtained, which is necessary to determine the knocking precisely.

A second embodiment of the invention is described herein after.

The differences between the first embodiment and the second embodiment are following two points.

(First Difference 1-1)

In step S390, it is determined whether the value of the counter CNT is larger than 17. Therefore, the integrate values INT are calculated from INT (0) through INT (16).

Step S140 is deleted. In the A/D converting process, the knocking determination is not carried out.

Second Difference 1-2)

Figure 8:
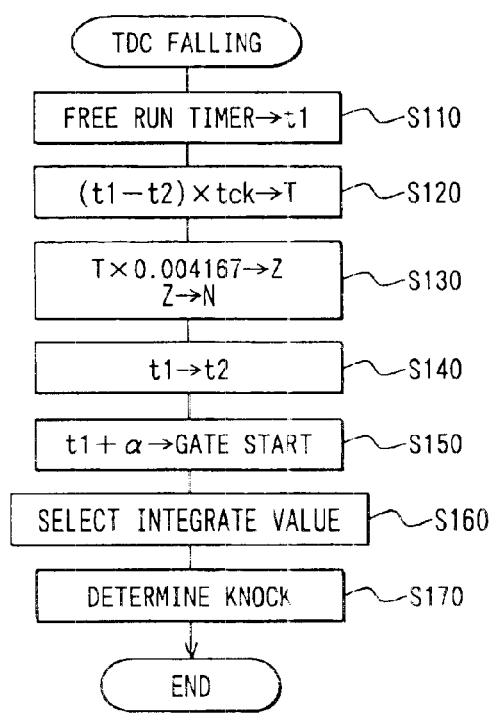
FIG. 8 is a flow diagram showing a TDC falling process executed by the microcomputer in a second embodiment of the invention.

The TDC falling process shown in FIG. 8 is carried out instead of the TDC falling process shown in FIG. 4.

In the TDC falling process shown in FIG. 8, step S150 is modified and step S160 and S170 are added after step S150. The other processes are same as the process shown in FIG. 4.

In step S150, according to the subtracted value (=t1−t2), a value of the free run timer is calculated. The value of the free run timer as a count value a corresponds to the 10° CA. The count value α is added to the value memorized in the memory t1 to get a new value which is memorized as a gate starting time. In the second embodiment, the gate starting time represents an estimated time after 5° CA from the TDC timing.

When the rotational speed of the engine is constant, and when there is no difference between the previous TDC timing T and the present TDC timing T, seventeen integrate values are calculated during knock determining period corresponding to 85° CA: from ATDC 5° CA to 90° CA. The integration of N filter processed data (corresponding to 5° CA) is executed during the ATDC 5° CA to ATDC 90° CA. In FIG. 9 and FIGS. 10–12, each of the integrate value is illustrated at the previous position compared to FIG. 3.

Instep S160, a changing rate W (=(Tb/Ta)−1) is calculated. The changing rate W represents the increased amount of the rotational speed of the engine. According to the TDC period T calculated in the previous step S120 (corresponding to the rotational speed Vb, hereinafter denoted as Tb) and the TDC period T calculated in present step S120 (corresponding to the rotational speed Va, hereinafter denoted as Ta), the rotational speed of the engine Va is obtained. The rotational speed of the engine Vb is obtained from the second previous TDC timing to the previous TDC timing. The changing rate W represents the increased amount from the rotational speed Va to the rotational speed Vb.

In step S160, the series number of the integrate value for the knocking determination is selected from the 17 integrate values according to the changing rate W.

(Case 1-2-2)

Figure 9:
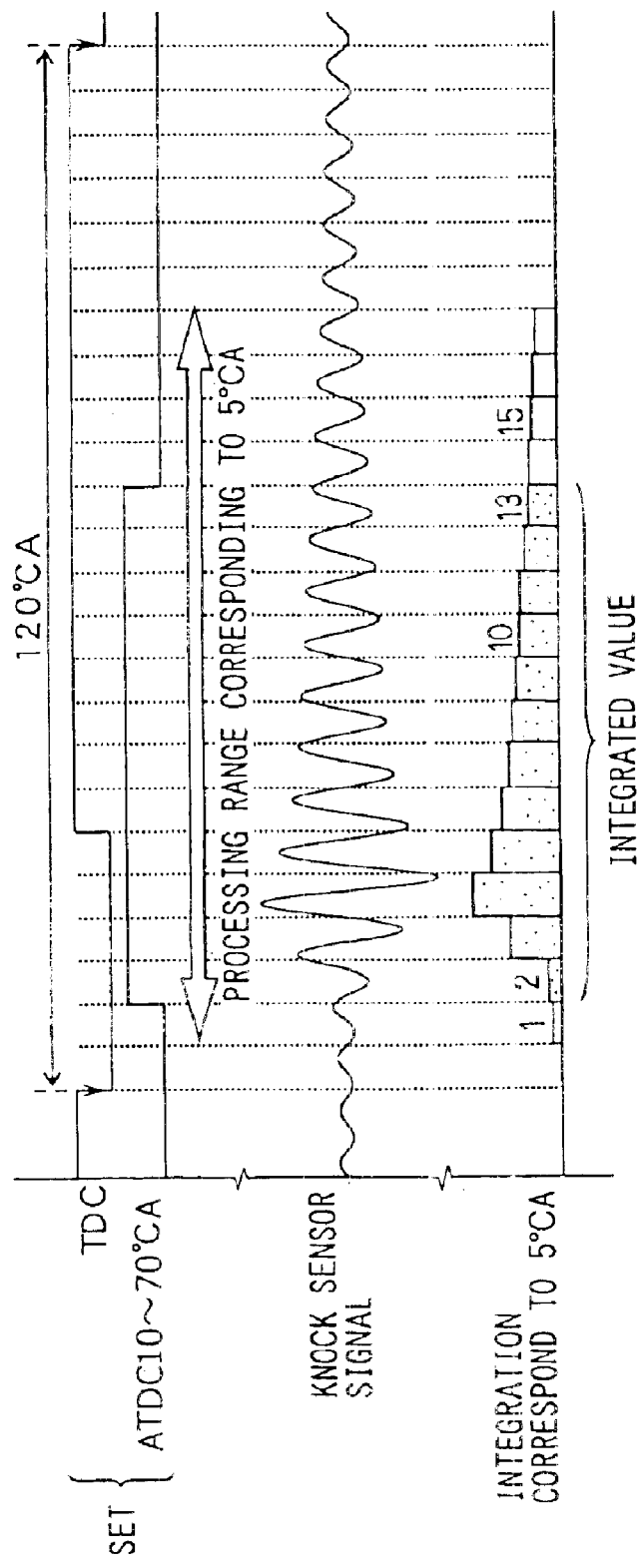
FIG. 9 is a chart showing the operation when the rotation number of an engine is substantially constant in the second embodiment.

When the changing rate W is between −G (G is, positive number, for example 0.1) and +G, i.e. the increased amount or decreased amount of the rotational speed of the engine is within 100×G percent, and when the rotational sped of the engine is constant, the second through thirteenth integrate value is selected as shown in. FIG. 9. In this case, the integrate value corresponding to the ATDC 10° CA through ATDC 70° CA is selected.

(Case 1-2-2)

Figure 10:
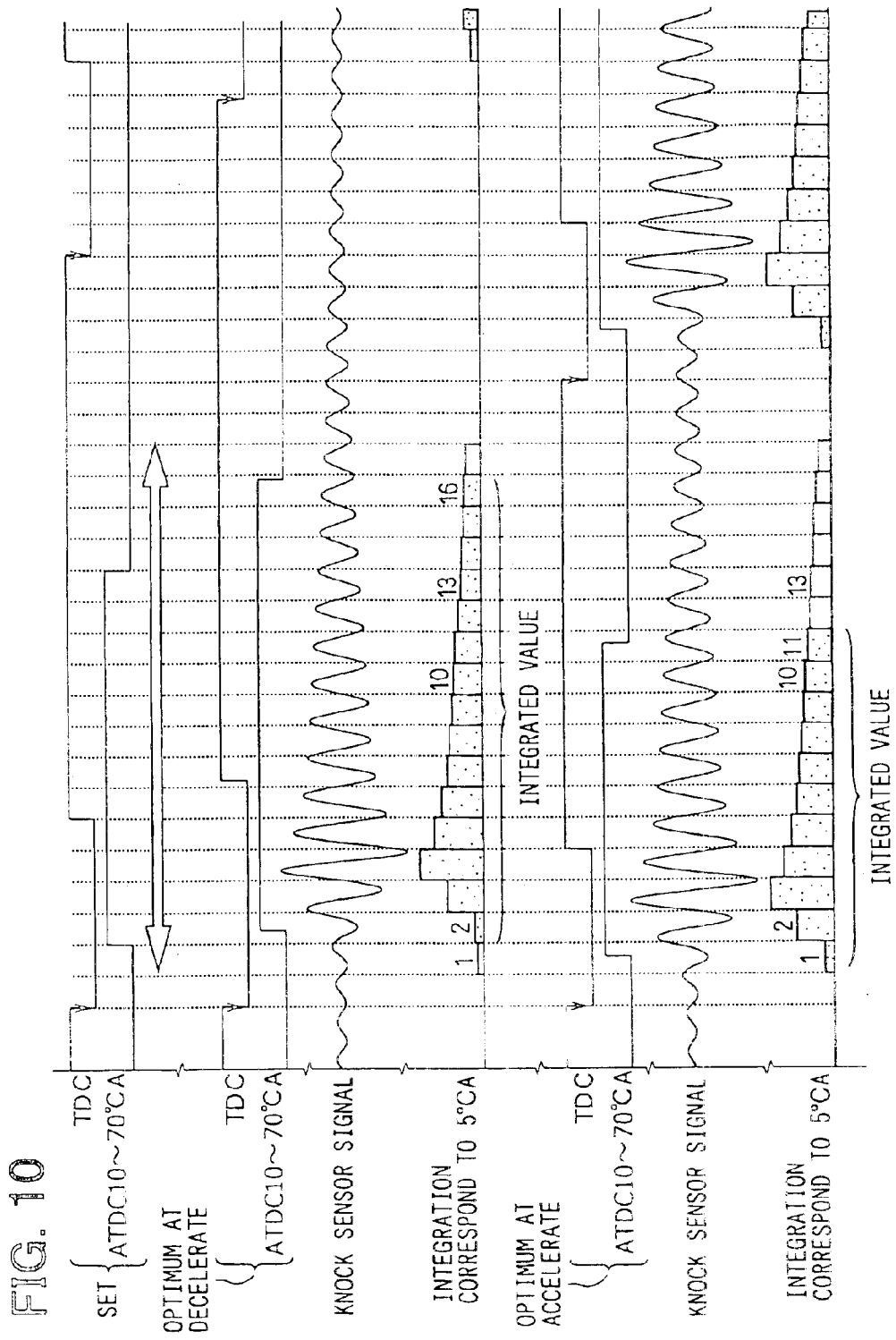
FIG. 10 is a chart showing the operation when the rotation number of an engine is rapidly decreased or increased in the second embodiment.
Figure 11:
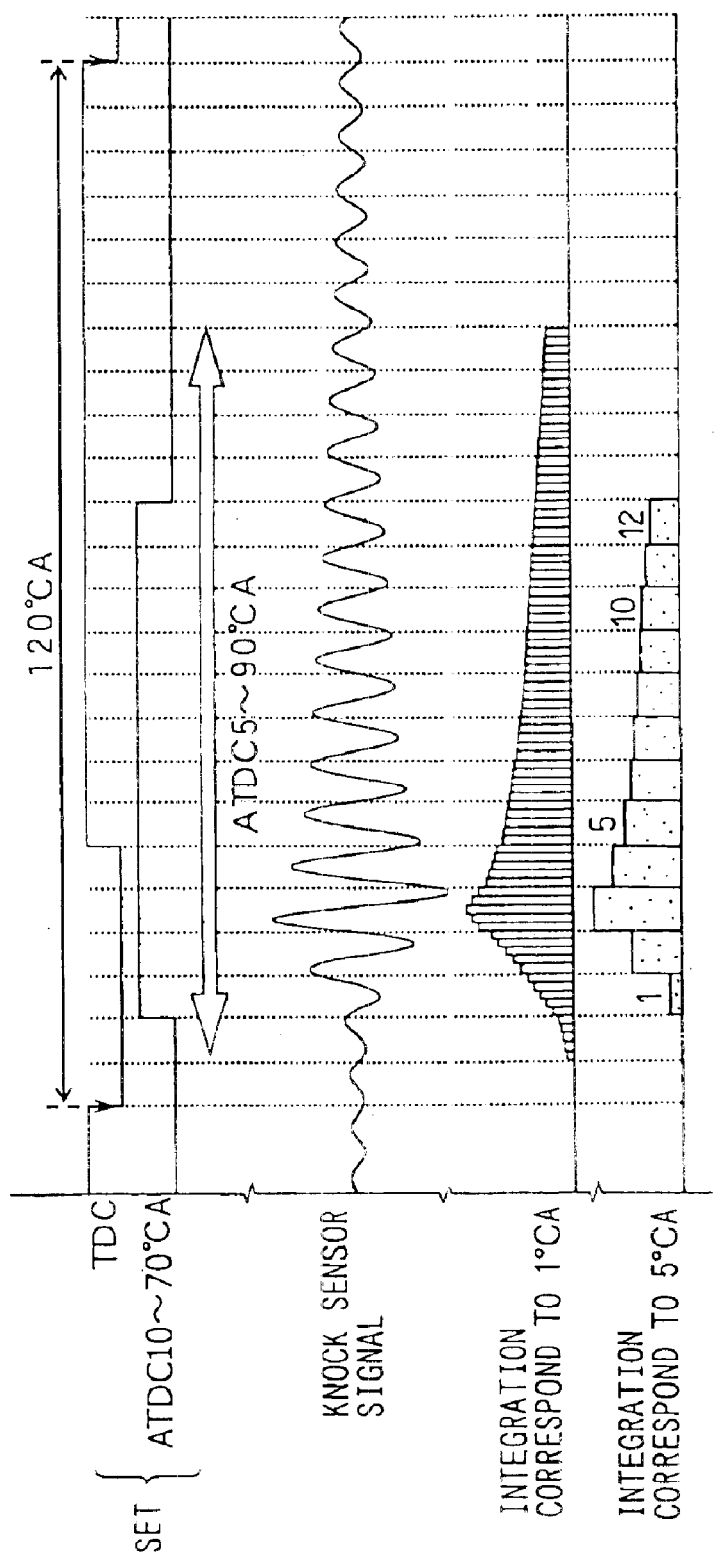
FIG. 11 is a chart showing the operation when the rotation number of engine is substantially constant in a third embodiment.

When the changing rate W is less than −G, i.e. the rotational speed of the engine is decreased more than 100×G percent, the second integrate value through the sixteen integrate value are selected as shown in middle part of FIG. 10. In this case, the integrate value corresponding to the ATDC 10° CA through ATDC 70° CA after deceleration is selected.

(Case 1-2-3)

When the changing rate W is more than +G, i.e. the rotational speed of the engine is increased more than 100×G percent, the first integrate value through the eleventh integrate value are selected as shown in middle part of FIG. 10. In this case, the integrate value corresponding to the ATDC 10° CA through ATDC 70° CA after acceleration is selected.

In step S170, the knocking determination is processed base on the integrate values selected in step S160.

It is unnecessary to derive seventeen integrate value. It is enough to derive sixteen integrate value: from the first integrate value to the sixteenth value. When the rotational speed of the engine is constant, twelve integrate values are used for knocking determination. When the rotational speed of the engine is decreased, fifteen integrate values are used for knocking determination. When the rotational speed of the engine is increased, eleven integrate values are used for knocking determination. These number of the integrate values does not affect the recognition of the knocking wave. In the second embodiment, the process executed in step S160 corresponds to a selecting an integrate value means.

In the second embodiment, since the plural integrate values are selected according to the engine condition, even in acceleration or deceleration of the engine, it is possible to determine the knocking by means of the integrate value corresponding to the ATDC 10° CA through ATDC 70° CA as shown in FIG. 10.

When the knocking determination is carried out by recognizing the shape of the knock sensor signal wave, latter integrate values (for example, tenth integrate value henceforth) do not affect the knocking determination, thus following modification can be established.

In step S160, only when the engine is accelerated in the case 1-2-3, the first integrate value through the eleventh integrate value are selected for the knocking determination. In other case, the second integrate value through the twelfth integrate values can be selected.

As described above, since the constant number of the integrate value is selected, the knocking determination process in step S170 can be stable. In this case, twelve integrate values are enough to determine the knocking.

When the integrate processing of the knock sensor signal during the knocking determination corresponding to the ATDC 10° CA −70° CA is needed, the integration corresponding to 5° CA is configured so that the number of the integrate value become seventeen since the estimated timing of the ATDC 5° CA. After detecting the timing of the ATDC 70° CA which is the timing of gate finishing, the integrate processing corresponding to 5° CA can be finished even if the number of integrate value has not reached seventeen.

When the engine is accelerated, the first through the last integrate values are used. In other case, the second integrate value through the last integrate value can be used. By comparing the actual timing of the ATDC 70° CA with the estimated timing of the ATDC 70° CA, it is acquired that the engine is accelerated or decelerated.

In this configuration, the actual timing of the ATDC 70° CA is obtained not withstanding the speed of the engine. The way of stopping the integrate processing at the timing of the ATDC 70° CA is to stop the processing after all integration is accomplished and to stop the processing immediately with utilizing the previous value.

A third embodiment of the invention is described below.

The engine control system of the third embodiment is different from the second embodiment at following three points (2-1)-(2-3).

(First Difference 2-1)

In step S130 shown in FIG. 8, according to the TDC period T, the value Z is obtained by dividing the period which is required for the crankshaft to rotate a certain angle less than 5° (in the first embodiment, 1°) by the sampling period ts (=10 μs), and then the value N is calculated by rounding the value Z.

The value Z is calculated by the following equation.

$$Z = T \times 0.000833 \quad \text{(equation 3)}$$
$$= T \times (1° \ CA / 120° \ CA / 10 \ \mu s)$$

In the third embodiment, the value N is set to 1/m (m is a natural number 2 or more. In this embodiment, m=5), the filter processed data is added one by one which corresponds 1° CA. The integration of the filter processed data N is referred as an integration of 1° CA.

(Second Difference 2-2)

The preset value compared to the value of counter CNT in step S390 shown in FIG. 6 is determined to the value (=85) which is derived by multiplying the value (=17) and m (=5).

The integration of 1° CA is derived 85 times from INT (0) to INT (84) in the third embodiment. When the rotational speed of the engine is constant, and when the period from the pervious TDC timing to the present TDC timing is equal to the period from the present TDC timing to the next TDC timing, the integration of 1° CA is derived 85 times in the range from the ATDC 5° CA to the ATDC 90° CA, the range being more broad than the knock determining period (ATDC 10° CA to ATDC 90° CA).

(Third Difference 2-3)

In step S160 shown in FIG. 8, the changing rate W (=(Tb/Ta)−1) is calculated as same as the second embodiment, however, the process selecting the integrate value is skipped and step S170 is executed.

In step S170, based on the changing rate W, the knocking determination is processed as following steps.

(Step 1)

When the changing rate W is more than −G (G is a positive number: for example, 0.1) and less than +G, i.e. acceleration and deceleration is within the rang of 100×G percent and the rotational speed of the engine is substantially constant, each integrate value corresponding to 1° CA is integrated at every "m" 1 value from the first value to get the "b" integrated values. In this embodiment, "m" is 5 and "b" is 12. Then, it is determined whether the knocking arises or not. In this case, the knocking determination is carried out on the basis of the integrated value corresponding to predetermined period (the ATDC 10° CA to the ATDC 70° CA).

(Step 2)

Figure 12:
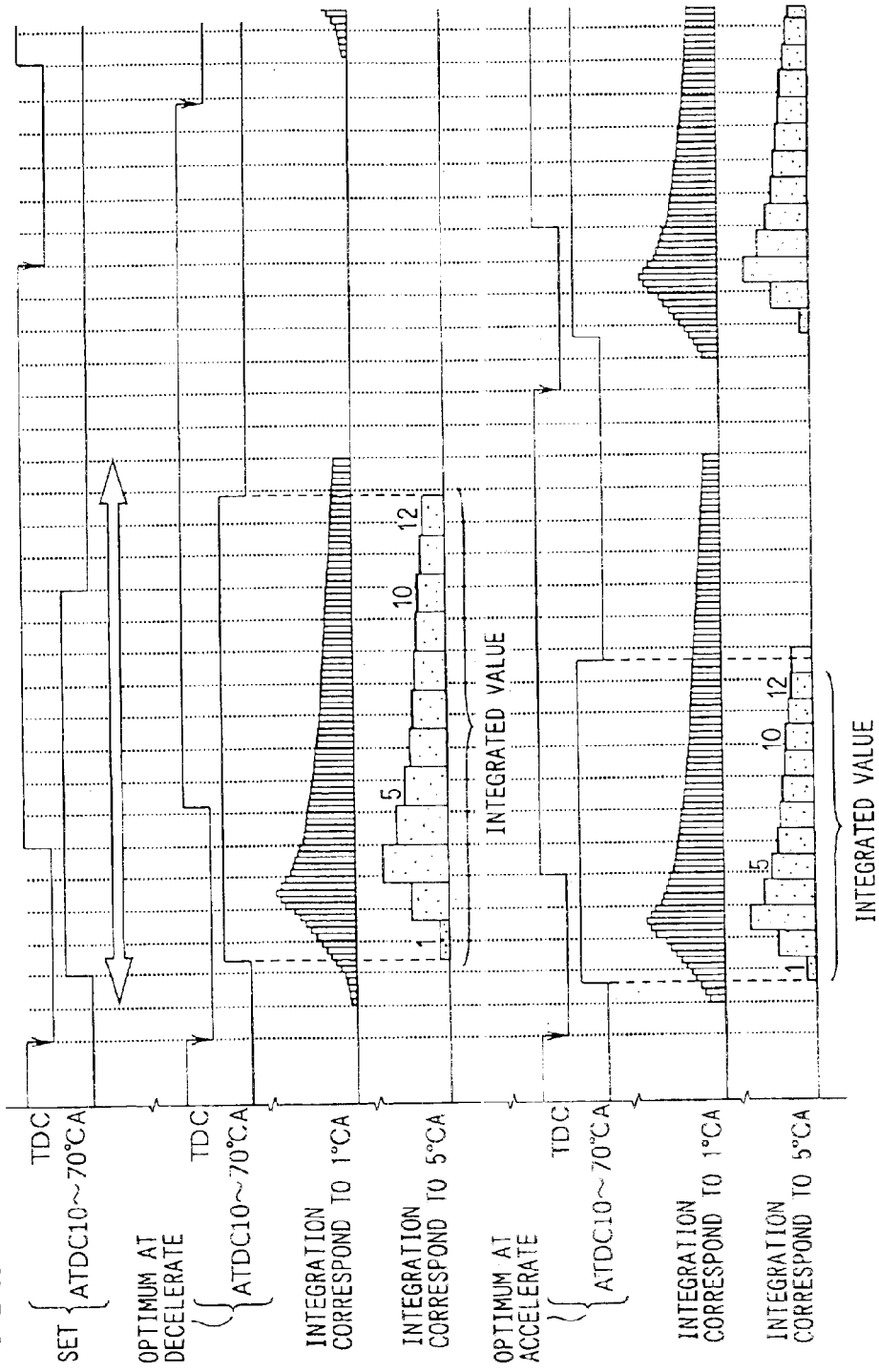
FIG. 12 is a chart showing the operation when the rotation number of an engine is rapidly decreased or increased in the third embodiment.
Figure 13:
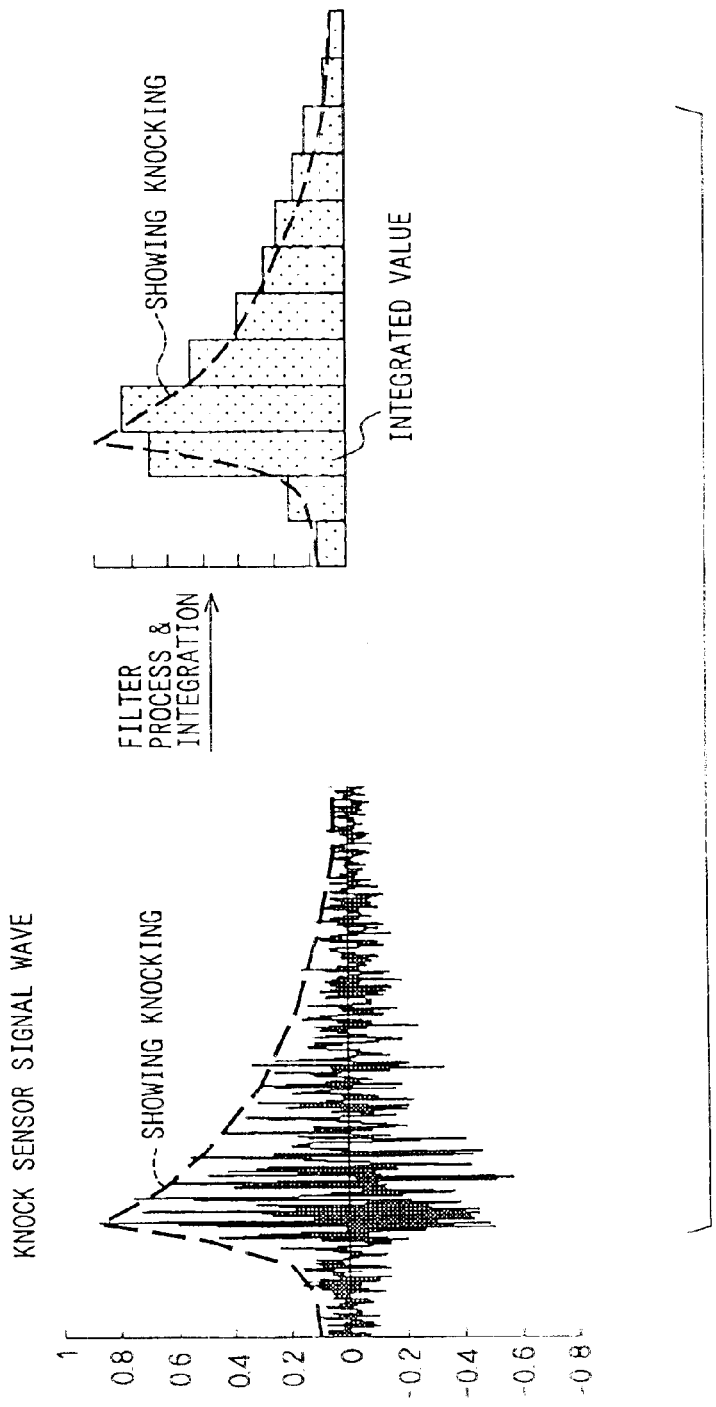
FIG. 13 is a first graph for explaining a conventional system and the problem thereof.

When the changing rate W is less than −G, i.e. deceleration of engine is more than 100×G percent, the knocking determination is executed according to the twelve integrated values as shown in middle portion in FIG. 12. The twelve integrated values are derived by integrating each integration of 1° CA every certain number which is lager than "m", for example, 6.

The knocking determination is processed based on the value corresponding to the ATDC 10° CA to the ATDC 70° CA after deceleration.

(Step 3)

When the changing rate W is larger than +G, i.e. acceleration of engine is more than 100×G percent, the knocking determination is executed according to the twelve integrated values as shown in lower portion in FIG. 12. The twelve integrated values are derived by integrating each integration of 1° CA at every certain number which is less than "m", for example, 4.

The knocking determination is processed based on the value corresponding to the ATDC 10° CA to the ATDC 70° CA after acceleration.

In the third embodiment, since the plural integrate values are selected according to the engine condition it is possible to determine the knocking by means of the integrate value corresponding to the ATDC 10° CA through ATDC 70° CA as shown in FIG. 12, even in acceleration or deceleration of the engine.

The embodiments described above can be modified as follows.

The knocking determining process can be executed by plural digital filter process and integral process. The plural digital filter processes are executed to the A/D converted knock sensor signal, the digital filter processed data are integrated, and then it is determined whether the knocking arises or not. In this case, the number of the integrated value is changeable at every filtering process. When the number of the integrated value is constant, the counter CNT and the memory n can be common in each processing.

A vibrating sensor, an ion current sensor or a cylinder pressure sensor can be used as the knock sensor.

What is claimed is:

1. A knocking detecting device, comprising:
   a signal processing means which converts an analog knock sensor signal into a digital knock sensor signal and filters the digital knock sensor signal digitally every sampling time period;
   a calculating means which calculates a value indicative of the number of A/D conversions in a time period required for a crankshaft to rotate a predetermined angle based on the rotational speed of an engine and converts the value into integer N;
   an integrating means which integrates the filter processed data processed by the signal processing means every N during a predetermined period from a process starting time synchronized with a rotation of a crankshaft; and
   a knock detecting means which detects the existence of the knocking based on the plural integrated values,
   the calculating means deriving N before the integrating means starts to process and keeping N constant during a processing period of the integrating means.

2. The knocking detecting device according to claim 1, wherein the calculating means measures an interval between reference signals arising when the crankshaft rotates to a fixed angle and multiplies the interval and a constant number together, the constant number being calculated based on the fixed angle, the predetermined angle and the sampling period.

3. The knocking detecting device according to claim 1, wherein the calculating means fixes the integer N when the number of rotational speed is under a predetermined value or over a predetermined value.

4. The knocking detecting device according to claim 1, wherein the calculating means integrates the filter processed data every N until the number of integration reaches a, a being a natural number larger than 1,
- the knock detecting means determines whether the knocking arises or not,
- the calculating means rounds the value whereby the integer N is derived, and
- the natural number a is increased when the calculating means rounds down the decimal place of the value to derive N.

5. The knocking detecting device according to claim 1, wherein a process starting time of the integrating means is established as a time in which the crankshaft rotates to an angle form a reference angle,
- the integrating means integrates the filter processed data every N until the number of integration reaches two or more, and
- the detecting means detects the acceleration or deceleration of an engine based on a rotational speed of the engine until the rotational position of the crankshaft reaches the reference angle and based on a rotational speed of the engine during a period until the integration means finishes the calculation of the integrated value from a time in which the rotational position of the crankshaft in the reference angle, the detecting means is provided with an integrated value selecting means which selects a series of integrated values according to the acceleration or deceleration of the engine, the integrated value selecting means determining an existence of the knocking.

6. The knocking detecting device according to claim 5, wherein the integrated value selecting means selects a constant number of the integrated value as an actual number of the integrated value to be used for determining knocking.

7. The knocking detecting device according to claim 1, wherein a process starting time of the integrating means is established as a time in which the crankshaft rotates to an angle form a reference angle,
- the integrating means integrates the filter processed data every N until the number of integration reaches two or more, and
- the detecting means detects the acceleration or deceleration of an engine based on a rotational speed of the engine until the rotational position of the crankshaft reaches the reference angle and based on a rotational speed of the engine during a period until the integration means finishes the calculation of the integrated value from a time in which the rotational position of the crankshaft in the reference angle,
- the detecting means determining the knocking based on b pieces of the integrated numbers which are integrated from a first integrated numbers every m when the acceleration or deceleration of the engine is within a predetermined percent,
- the detecting means determining the knocking based on b pieces of the integrated numbers which are integrated from the first integrated numbers every fixed number larger than m,
- the detecting means determining the knocking based on b pieces of the integrated numbers which are integrated from the first integrated numbers every fixed number smaller than m, and
- m and b being natural numbers more than two.

* * * * *